April 16, 1963 R. KORN 3,085,778
ADJUSTING MEANS FOR SWING LEVER SUSPENSIONS
Filed Dec. 27, 1960 6 Sheets-Sheet 1

INVENTOR
ROBERT KORN

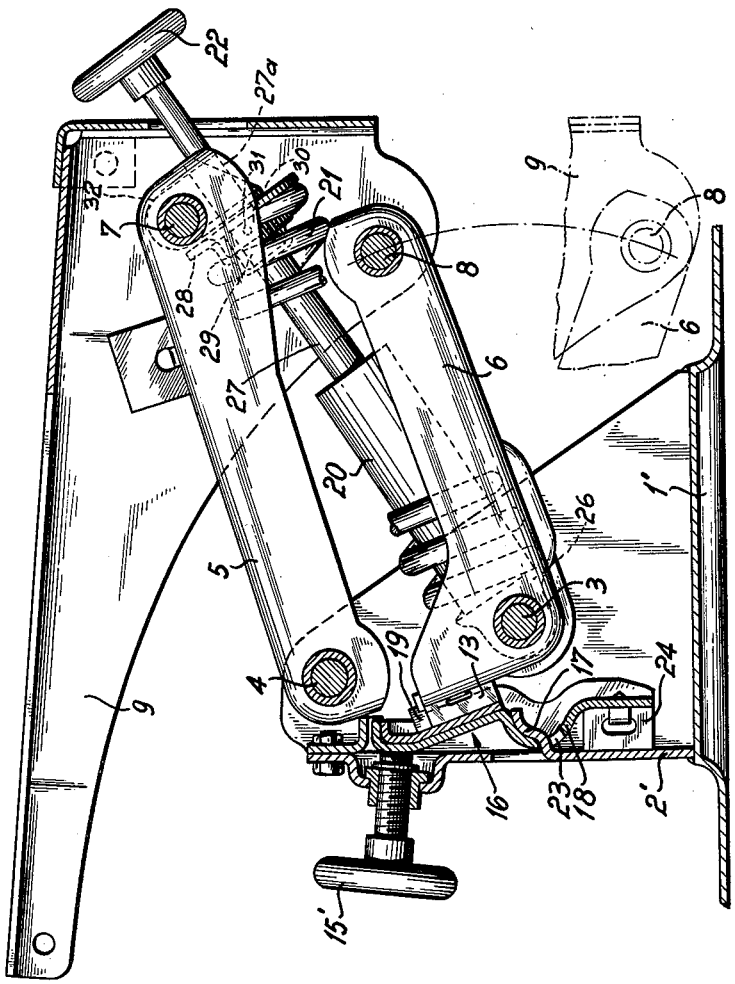

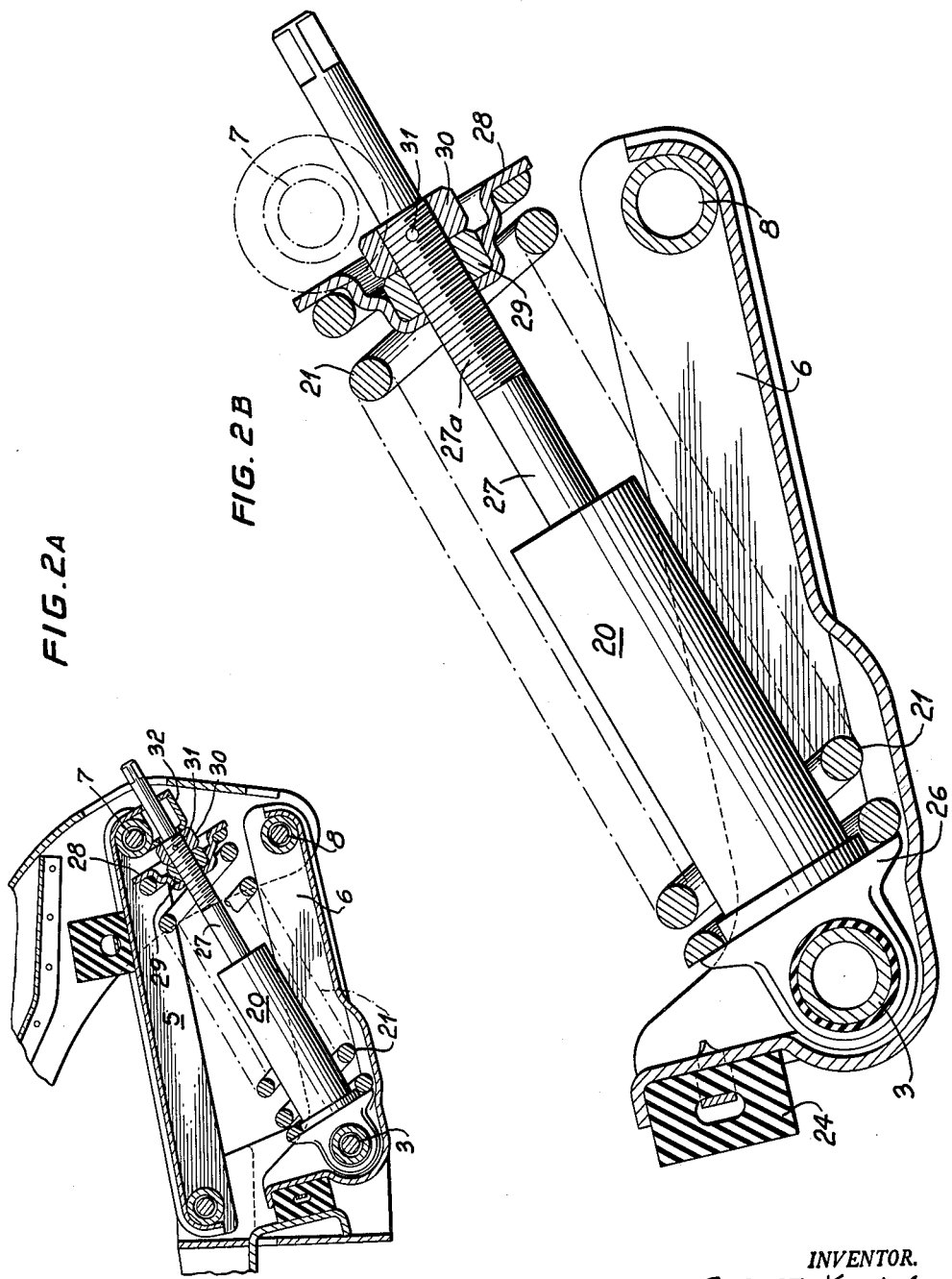

April 16, 1963   R. KORN   3,085,778
ADJUSTING MEANS FOR SWING LEVER SUSPENSIONS
Filed Dec. 27, 1960   6 Sheets-Sheet 4

INVENTOR
ROBERT KORN

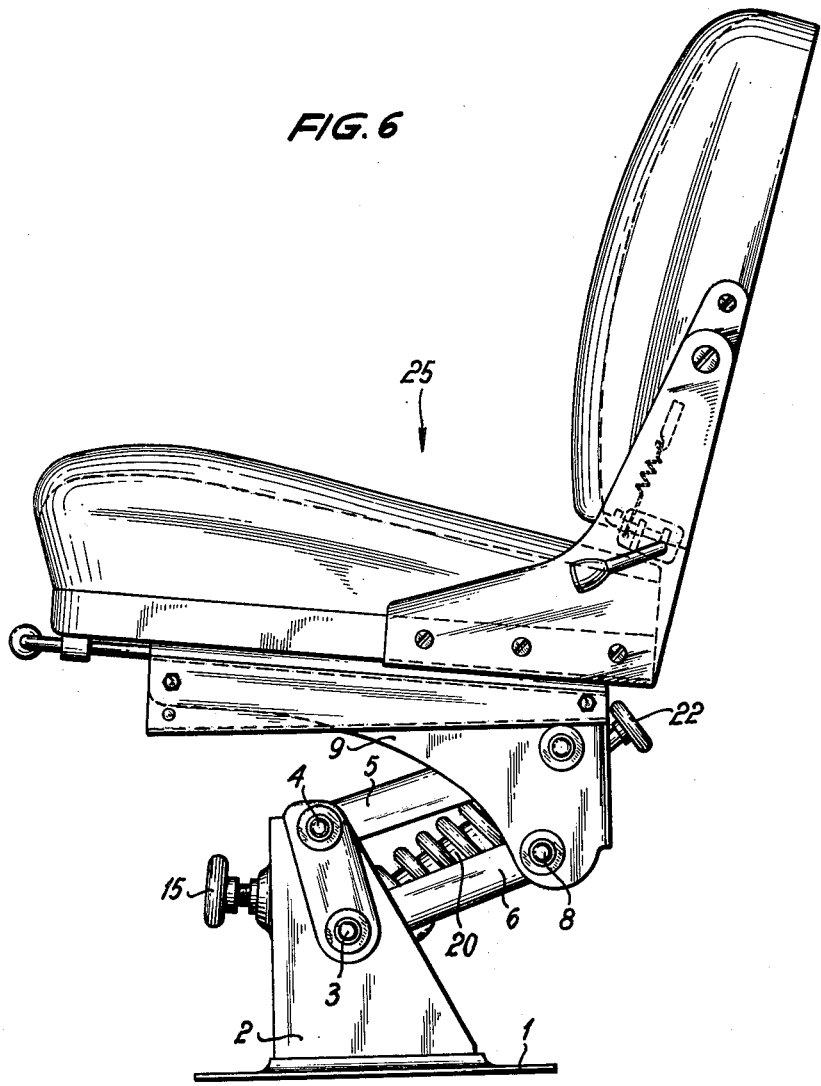

April 16, 1963   R. KORN   3,085,778
ADJUSTING MEANS FOR SWING LEVER SUSPENSIONS
Filed Dec. 27, 1960   6 Sheets-Sheet 6

INVENTOR
ROBERT KORN
By

United States Patent Office 3,085,778
Patented Apr. 16, 1963

3,085,778
ADJUSTING MEANS FOR SWING LEVER SUSPENSIONS
Robert Korn, Eikestrasse 17, Kreisensen, Harz, Germany
Filed Dec. 27, 1960, Ser. No. 78,401
Claims priority, application Germany Jan. 23, 1960
5 Claims. (Cl. 248—399)

This invention relates to adjusting means for swing lever suspensions, particularly for the swing lever suspensions of seats in vehicles, such as tractors, lorries, and saloon cars.

The adjusting means of the present invention are applicable with special advantage to swing lever suspensions comprising two substantially parallel levers forming members of a quadrilateral or parallel linkage interposed between the member supporting the load and the vehicle body, and a resiliently yieldable diagonal strut which forms a damping member. Nevertheless, the adjusting means of the present invention are also suitable for use in conjunction with any type of swing lever suspension in which a rigid sprung lever arm connected with a load-carrying member is hinged to the vehicle body, for instance to the pedestal base of a seat.

In swing lever suspensions, it is desirable to provide for adjustment of the degree of damping as well as of the maximum amplitude of swing deflection of the suspension because experience has shown that the irregularities of the track, fluctuations in speed, and differences in the weight of the driver, all of which factors affect the driver, cannot be controlled by adjusting only the damping of the suspension.

It is therefore proposed in the present invention to arrange the adjusting means in such a way that they can be set by the driver, while seated, to conform with his weight in the stationary condition of the vehicle and then to effect adjustments according to the nature of the surface of the road and to the vehicle speed when the vehicle is in motion.

Resilient deflection limiting devices interposed between lever suspensions and the vehicle body are known. They may, for instance, consist of a rubber buffer mounted on a rigid spring lever connected with the load-carrying member, said buffer striking a fixed abutment on the vehicle body when the amplitude of lever deflection exceeds a given amount. The incorporation of such deflection limiting means permanently determines the maximum possible amplitude of swing deflection.

The invention solves the problem outlined above by providing a deflection limiting means for determining the height of the load bearing members and thus the maximum amplitude of swing deflection and by making said deflection limiting means adjustable. The deflection limiting means may consist of the combination of an adjustable rigid abutment and of a non-adjustable resilient buffer, one of said elements being mounted on the vehicle body, for instance, on the pedestal base of a seat, and the other on one of the lever links of the swing lever suspension, which is adjustable in relation to the pedestal base, or conversely.

A rubber element has been found to provide a serviceable resilient buffer, and a tiltable lever or plate may form a useful adjustable cooperating abutment. In order to prevent the buffer element from being excessively stressed, a supplementary fixed stop may be provided between the vehicle body and the movable member of the spring lever suspension, said stop finally and positively intercepting the motion of the swing lever suspension after the rubber buffer has already absorbed part of the momentum. This final stop must be so adjusted that the material of the rubber buffer is safeguarded against deterioration by fatigue in continuous use, that is to say, when subjected to the shocks of repetitive impacts.

The adjustable rigid abutment in the form of a tiltable lever or plate on the pedestal base of the seat may be set by means of an adjusting screw in the pedestal base. This screw should be located within reach of the driver's hand when the driver is seated and the vehicle is in motion. Alternatively, the adjustable rigid abutment may be mounted directly on the load supporting member for cooperation with an elastic abutment on the vehicle body. The invention is not limited in scope to a particular arrangement of these several elements.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 2 illustrates the application of the invention to the driver's seat in a tractor, the seat being supported from a pedestal base secured to the vehicle body by a four-hinge swing lever suspension, the four-hinge swing lever suspension cooperating with a telescopic shock absorber combined with a helical spring having an adjustable damping characteristic;

FIG. 2A is a fragmentary sectional view showing the relation of the telescopic shock absorber shown in FIG. 2 to the swing lever suspension;

FIG. 2B is an enlarged sectional view of a portion of FIG. 2A;

FIG. 6 shows the application of the invention to a lorry seat which is designed in compliance with the standards laid down by the German Ministry of Transport.

Figure 1:
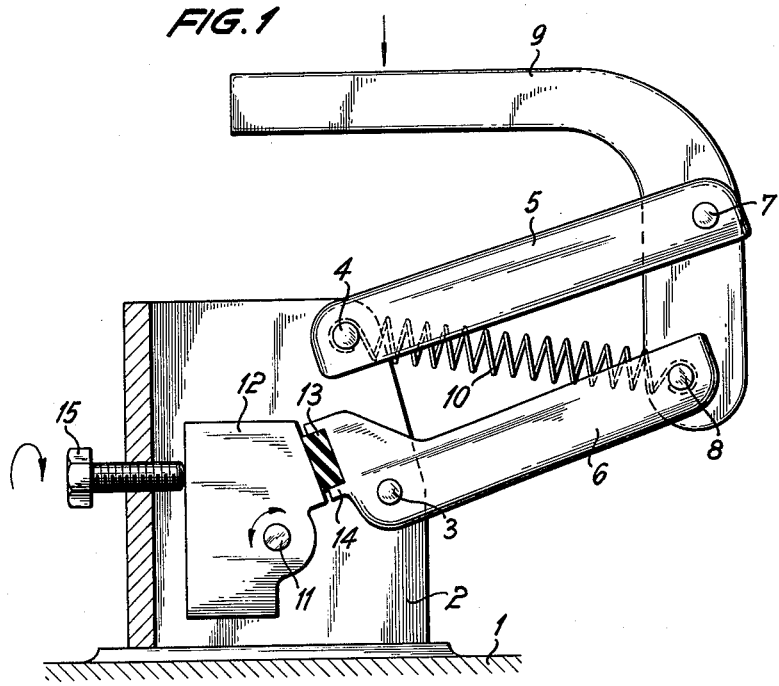
FIG. 1 is a schematic representation of adjusting means adapted to a four-hinge diagonal swing lever suspension for a vehicle seat.

In the swing lever suspension shown in FIG. 1, the seat 9 is swingably attached by lever arms 5, 6 hinged on pivots 3, 4 and 7, 8, respectively, to a pedestal base 2 which is rigidly secured to the vehicle body 1, the load on the seat being indicated by an arrow pointing vertically downwards.

The swinging deflections of the seat 9 are controlled by a diagonal spring 10. The means for adjusting the amplitude of swing deflection comprise an abutment member 12 which is tiltably deflectable in the pedestal base about a pin 11, and which cooperates with a rubber buffer 13 forming a resilient stop on the projecting end of one lever arm of the suspension. At the end of a given angular deflection the rubber buffer 13 provided in a mount 14 on lever arm 6 strikes the abutment member 12 and thus determines the maximum possible amplitude of swing deflection. Abutment member 12 is angularly adjustable by means of a screw 15 mounted in the wall 2 of the pedestal base. The abutment member 12 is tilted about its pivot pin 11 to the left or the right when the adjusting screw 15 is screwed further into or out of the pedestal base, the resultant position of the abutment member then determining the maximum amplitude of swing of the seat 9 and the height of the load bearing member.

Figure 5:
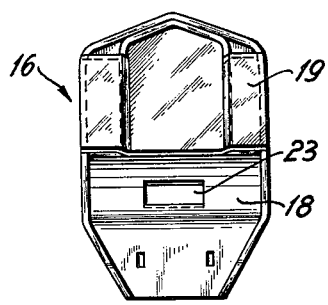
FIG. 5 is a plan view of the abutment member according to FIG. 4.
Figure 4:
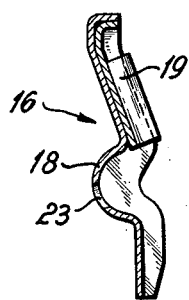
FIG. 4 is an adjustable rigid abutment in the form of a plate tiltably mounted on the pedestal base of the seat.
Figure 3:
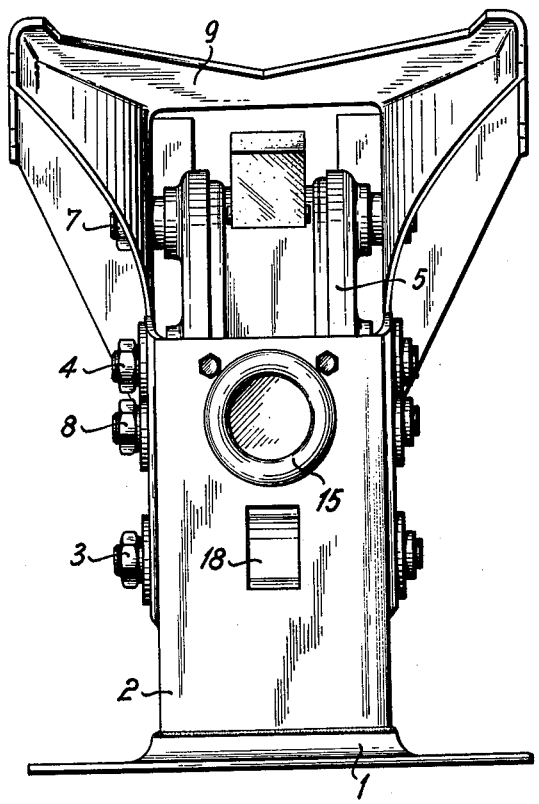
FIG. 3 is a front elevation of the swinging seat shown in FIG. 2, and illustrates the position of the control for adjusting the amplitude of swing deflection of the seat.

In the tractor seat illustrated in FIG. 2, the adjustable abutment takes the form of a plate 16 which is shown in greater detail in FIGS. 4 and 5. This plate is tiltably adjustable by means of an adjusting screw wheel 15' about a tubular cylindrical bearing face 17 on a wall 2' of the pedestal base 1', said bearing face being movable in a socket 18 in the plate. The tiltably deflectable plate 16 carries two projections 19 which intercept the end face of lever arm 6 when the rubber buffer 13 secured to the end of said lever has been compressed to a certain extent. Otherwise, this form of construction corresponds to that shown in FIG. 1.

The swing lever suspension is equipped with damping means adjustable by a control 22 and consisting of a combination of a shock absorber 20 with a helical spring 21 acting in parallel therewith. At the end of its full downward swing, the lever suspension and pivot pin 8 reach the position indicated in dotted lines in FIG. 2. By adjusting the screw 15' further into or out of the wall 2', the amplitude of maximum swing deflection is adjusted and control 22 permits the degree of damping of swing oscillations to be modified as required. The tiltable plate 16 has a cylindrical socket at 18 of a radius conforming with the cylindrical bearing face 17 on the wall 2' of the pedestal base, the socket being formed with an opening 23 which permits the plate to be hung over the cylindrical bearing when the seat is assembled. Moreover, the tiltable plate 16 in the example illustrated bears against a rubber buffer 24 which assists in generating a restoring momentum.

The cylinder of the shock absorber 20 is centered with its end around the pivot 3. This end bears a disc 26, against which spring 21 rests. The piston rod 27 of the shock absorber 20 is threaded at its right end 27a and bears a shell 28 which is guided within the U-shaped lever arm 5. Within the shell a threaded nut 29 is rigidly combined with shell 28. To the right of nut 29, a second nut 30 is provided which is attached to the threaded rod 27a by a pin 31 and limits movement of the rod 27 to the right because nut 30 meets a block 32 which is rigidly combined with lever arm 5 and loosely guides the threaded end 27a of rod 27. Therefore, if the driver turns wheel 22, the shell 28 slides up or down within the U-shaped lever arm 5 and tensions spring 21 to a greater or lesser degree. The outer end of rod 27 is free to slide in a wide range within the bore of block 32.

Figure 7:
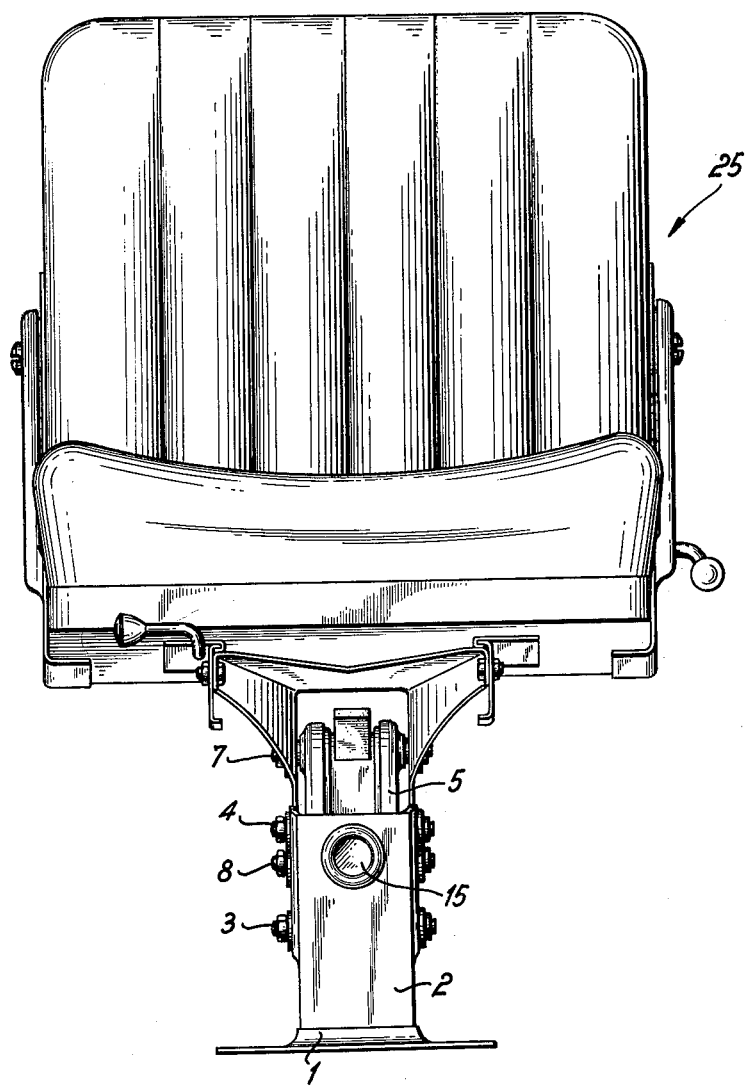
FIG. 7 is a front elevation of the seat shown in FIG. 6, and illustrates the adjustment control.

FIGS. 6 and 7 illustrate applications of the invention to a seat in a lorry. A similar arrangement can be employed for a saloon car. The location of the adjusting screw wheel 15' below the front edge of the seat generally indicated by 25 permits the driver to reset the height of the seat and thus the amplitude of swing when seated and driving the vehicle. The damping control 22 is similarly within reach of the seated driver while the vehicle is in motion.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. The combination of a swinging load carrying member, particularly a vehicle seat, and a height regulating device therefor comprising a fixed base member, a load carrying member, and a pair of parallel swingably hinged levers connected by a diagonally suspended spring means supporting said load carrying member from the base member, a rotatable abutment member on said base member, one of said levers being formed as a two-armed lever, a surface of one of said arms resting against said abutment member, said two-armed lever and said rotatable abutment member have parallel pivot axes whereby rotation of the abutment member serves to adjust the height of said load carrying member.

2. The combination according to claim 1 wherein an elastic buffer and a second final rigid abutment member are provided between said rotatable abutment member and said two-armed lever, said second abutment member being effective after predetermined compression of said elastic buffer.

3. The combination according to claim 1 wherein said rotatable abutment member comprises a plate pivotable on the base member and movable by an adjustable screw, said plate being pivotable within a cylindrical bearing on the wall of said base member and having a cylindrical socket of a radius conforming to the radius of said cylindrical bearing.

4. The combination according to claim 1 wherein said diagonally suspended spring means comprises a telescopic shock absorber and a helical spring acting in parallel therewith.

5. A swing lever suspension seat for vehicles comprising a base member adapted to be fixedly secured to a vehicle, a load carrying member, a swing element hinged to said base and load carrying members, and adjustable stop means arranged to limit the turning movement of said swing element and thereby the amplitude of swing deflection of said seat, said adjustable stop means including a tiltable lever pivotally supported on a tongue cutout from said base member, the position of said tiltable lever being adjustable by a screw, and a nonadjustable cooperating stop element in the form of rubber buffer mounted on the swing element.

References Cited in the file of this patent

UNITED STATES PATENTS

| | | |
|---|---|---|
| 2,334,922 | Gustafson | Nov. 23, 1943 |
| 2,506,924 | Huber | May 9, 1950 |
| 2,881,656 | Sutter | Apr. 15, 1959 |
| 2,917,103 | Korn | Dec. 15, 1959 |
| 2,936,818 | Harrington | May 17, 1960 |

FOREIGN PATENTS

| | | |
|---|---|---|
| 1,070,045 | Germany | Nov. 26, 1959 |